United States Patent
Takeda

(10) Patent No.: US 7,460,564 B2
(45) Date of Patent: Dec. 2, 2008

(54) TRANSPORT STREAM EDITING METHOD AND APPARATUS THEREFOR

(75) Inventor: Eishi Takeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 896 days.

(21) Appl. No.: 10/940,733

(22) Filed: Sep. 15, 2004

(65) Prior Publication Data
US 2005/0078941 A1  Apr. 14, 2005

(30) Foreign Application Priority Data
Oct. 10, 2003 (JP) .............................. 2003-352359

(51) Int. Cl.
H04J 3/06 (2006.01)
H04N 5/761 (2006.01)
G11B 27/00 (2006.01)

(52) U.S. Cl. .................... 370/535; 370/503; 348/423.1; 386/4; 386/52

(58) Field of Classification Search ........................ None
See application file for complete search history.

(56) References Cited

U.S. PATENT DOCUMENTS

| | | | | |
|---|---|---|---|---|
| 5,481,543 | A * | 1/1996 | Veltman | 370/473 |
| 5,936,925 | A * | 8/1999 | Yoshio et al. | 369/30.18 |
| 6,512,884 | B1 * | 1/2003 | Sawada | 386/96 |
| 2002/0018645 | A1 * | 2/2002 | Nakamatsu et al. | 386/96 |
| 2003/0023986 | A1 * | 1/2003 | Honmura | 725/134 |
| 2003/0103604 | A1 * | 6/2003 | Kato et al. | 379/68 |
| 2004/0052275 | A1 * | 3/2004 | Murakami et al. | 370/503 |
| 2004/0062516 | A1 * | 4/2004 | Takeda et al. | 386/4 |

OTHER PUBLICATIONS

H. Fujiwara, All of Video and Audio Compression Technology, Interface Additional Edit. Chapter 6, pp. 84-93, Apr. 1, 2000.
H. Fujiwara, ISOIEC 13818 Series, Point Zukaishiki Saishin MPEG Kyokasho, published by Nippon Denki Kogyokai, pp. 248-253, Aug. 1, 1994.

* cited by examiner

*Primary Examiner*—Chi H Pham
*Assistant Examiner*—Ahmed Elallam
(74) *Attorney, Agent, or Firm*—Fitzpatrick, Cella, Harper & Scinto

(57) ABSTRACT

An editing of a video signal and an audio signal time-shared multiplex compressed by an MPEG-2 transport method designates a dividing position of the video signal at a boundary of video TS packets constituting a GOP, constructing a stream in front of said designated dividing position so as to include all audio TS packets corresponding to video TS packets present in the stream, overwriting a video TS packet, not having a corresponding audio TS packet in the stream, with a dummy TS packet, and overwriting, in a stream behind said designated dividing position, an audio TS packet with a dummy TS packet until an audio TS packet, coinciding with a reproducing timing of a video TS packet at said dividing position, appears. Thus a defective data reproduction resulting from a discontinuity in the data structure of audio frame before and after the dividing position can be avoided.

3 Claims, 7 Drawing Sheets

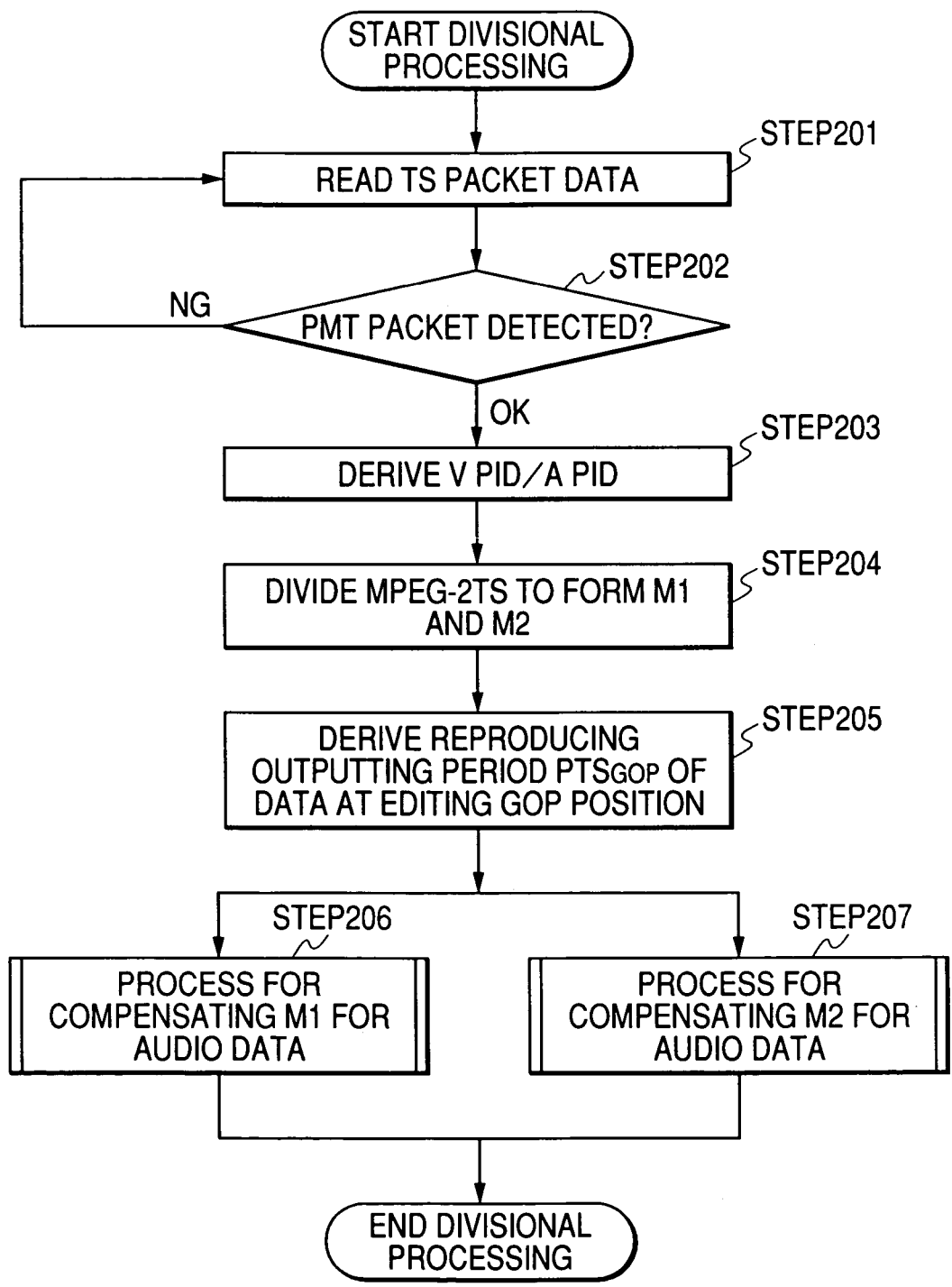

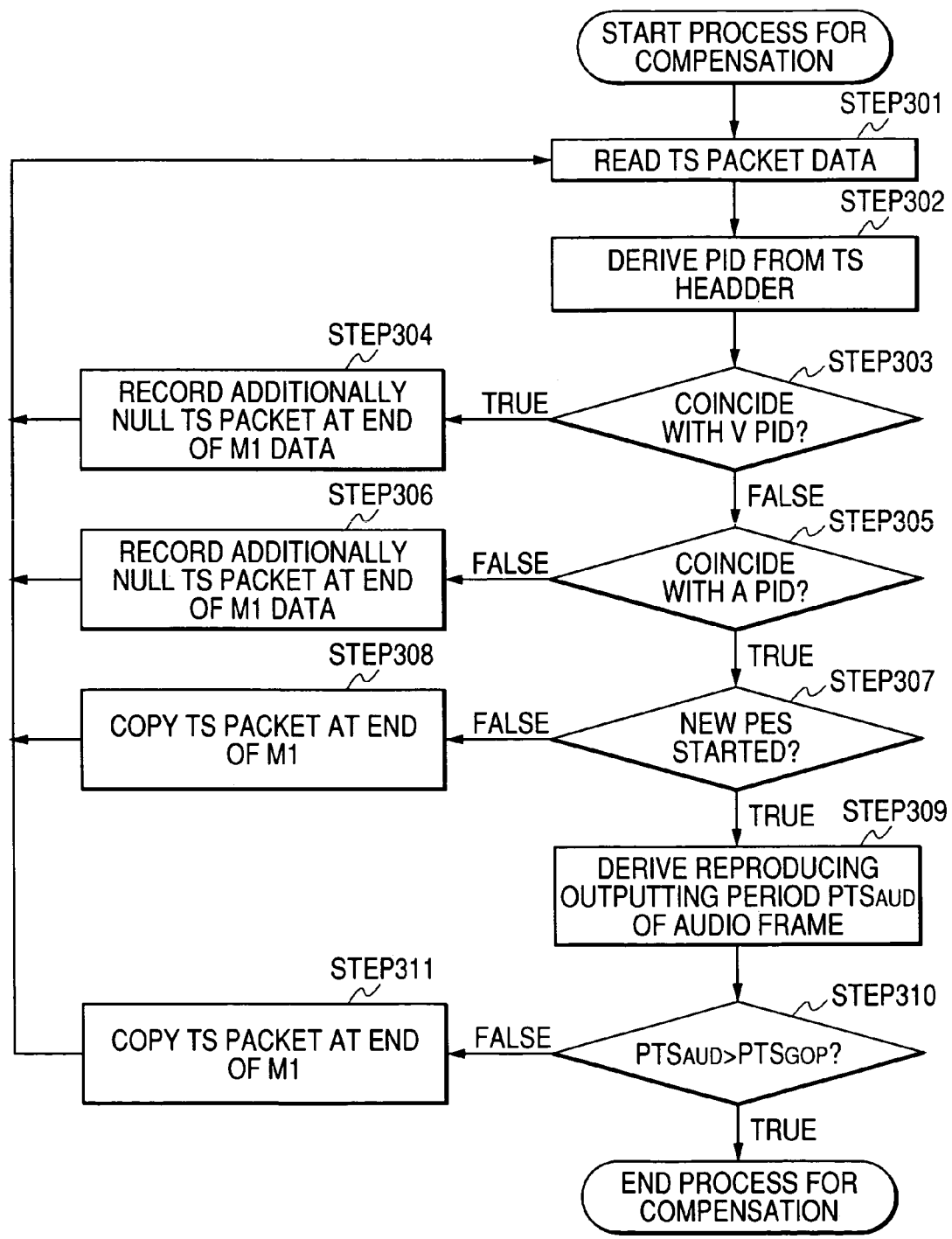

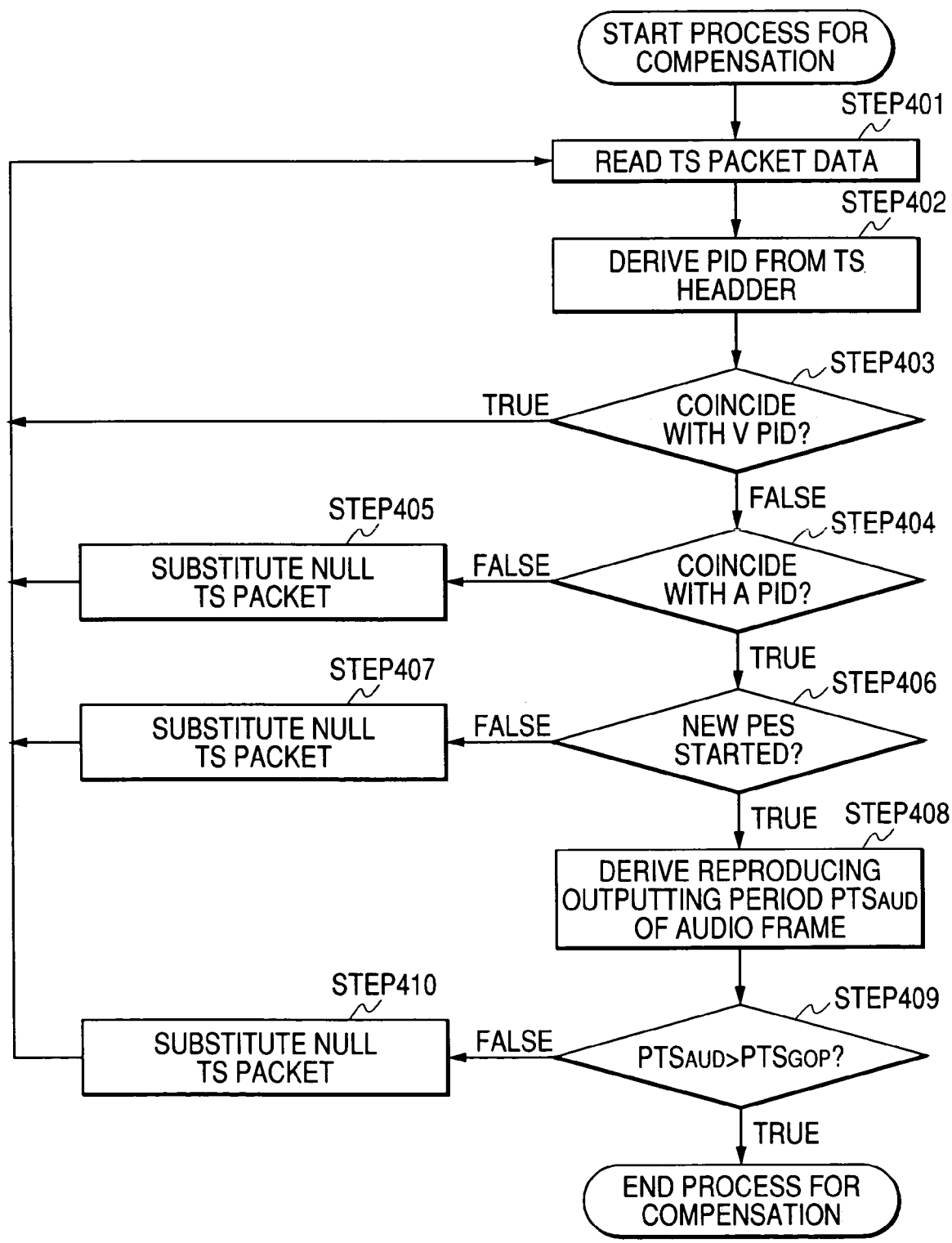

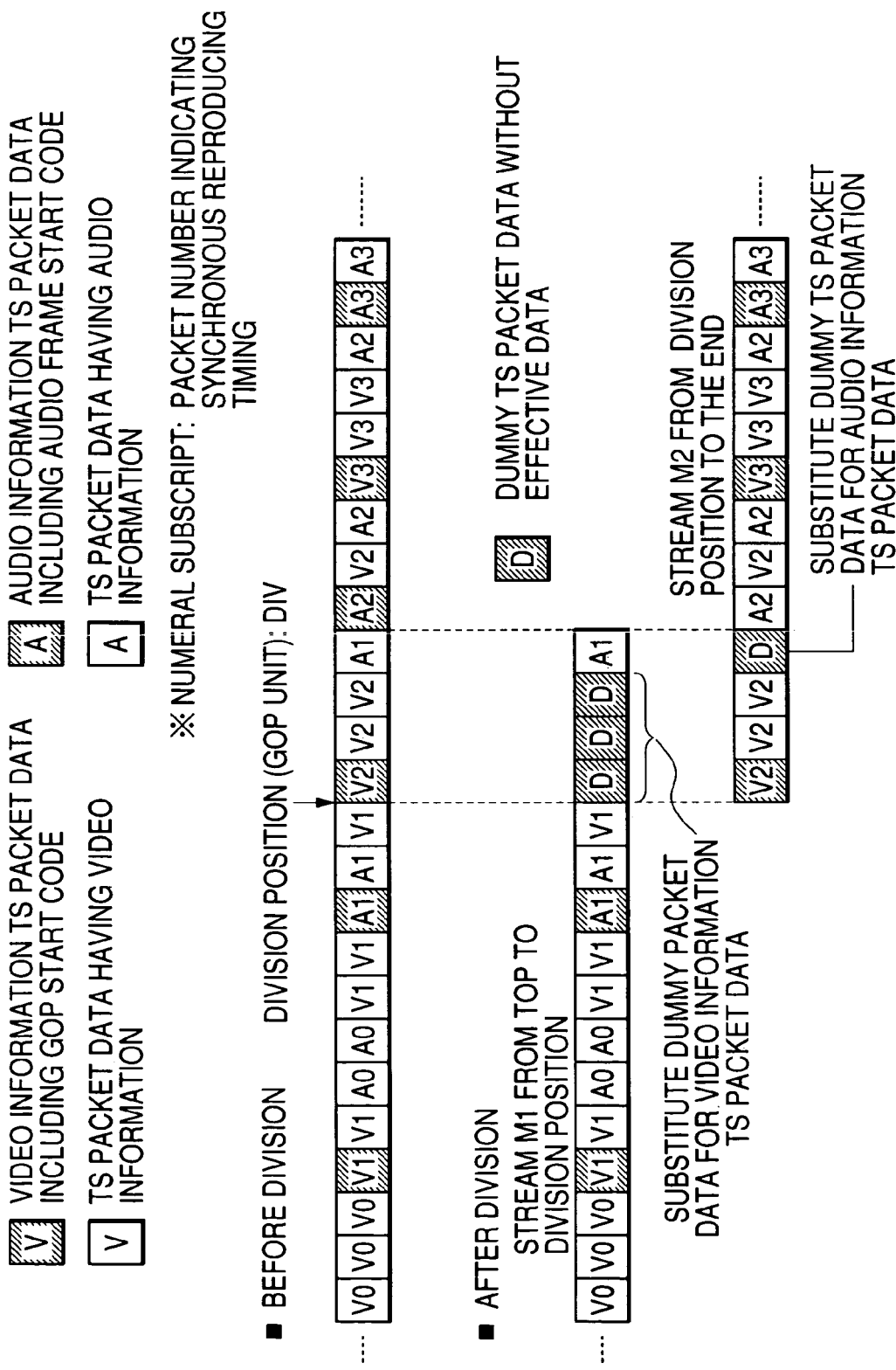

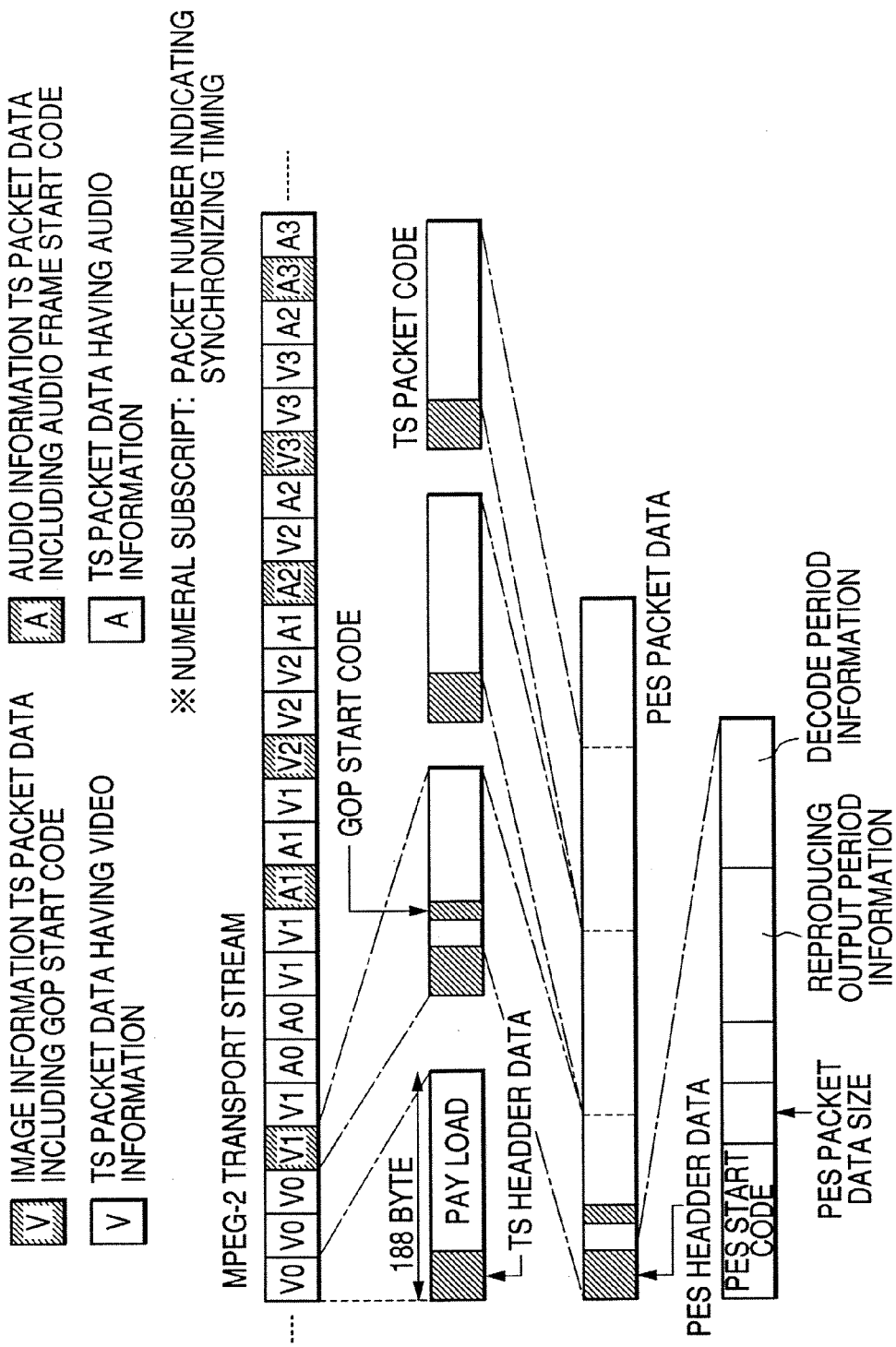

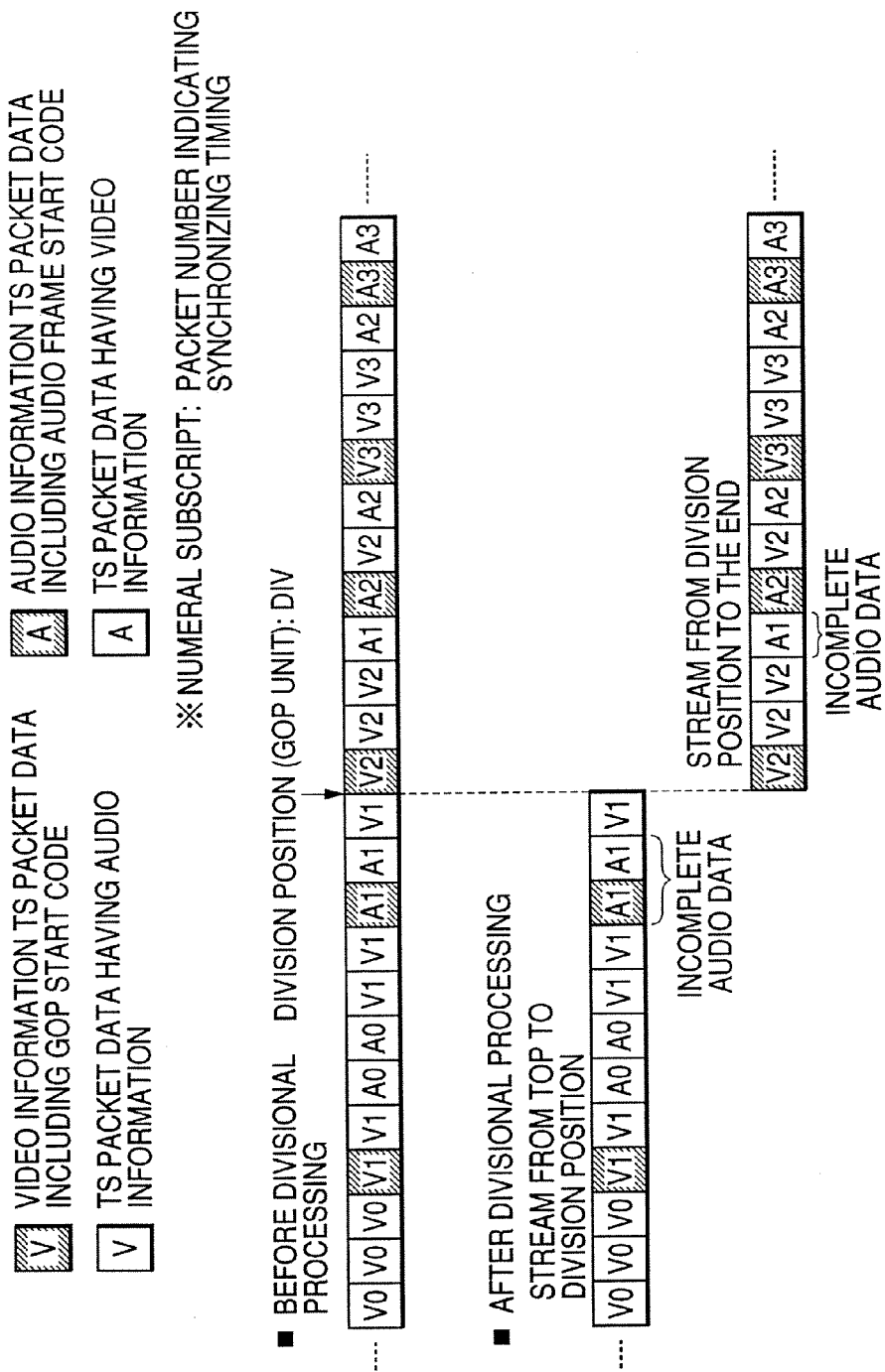

TRANSPORT STREAM EDITING METHOD AND APPARATUS THEREFOR

BACKGROUND OF THE INVENTION

1. Field of the Invention

The present invention relates to a method and an apparatus, employing a digital moving picture-audio compressing technology standards (Moving Picture Experts Group: hereinafter abbreviated as MPEG), for dividing and editing an MPEG-2 transport stream data formed by time-shared multiplexing of encoded digital moving video data and digital audio data.

2. Related Background Art

In the MPEG standard defined as a known technology in IEC/ISO 13818, an MPEG-2TS process is being employed as a data process for transmitting video signals and audio signals in satellite digital broadcasting and ground digital broadcasting in Japan, U.S.A. and European countries.

By recording the data compressed by such MPEG-2TS process in a digital state in a recording medium enabling random access such as a hard disk, an optical disk or a semiconductor memory capable of high-speed recording-reproduction thereby storing such data as a data file accessible to the user, it is rendered possible to repeatedly view an AV program of a high quality at any time or to achieve a random access reproduction or a program editing of a high freedom, without any deterioration in the quality of the video and the audio.

FIG. 6 shows a structure of MPEG-2TS data recorded on a recording medium. The MPEG-2TS data are formed by a TS packet of a fixed size of 188 bytes, which is constituted of a header information of 4 bytes and a payload information portion of 184 bytes having an actual AV information.

In the header information of the TS packet, there is provided an identifier (packet ID: hereinafter called PID) for identifying whether the payload information of the TS packet succeeding to the header information is video data or audio data. Also in the header information, there is provided an information bit (unit start indicator) for indicating whether new PES packet data are started in the payload information. A unit start indicator "1" indicates that a new PES packet is started, and otherwise indicates that the ensuing payload data are a continued part of PES packet data.

Also, as special information of the TS packet, there is defined a program map table (PMT) for managing map information of data constituting the stream, and the PID is uniquely defined for a TS packet having a video signal and a TS packet having an audio signal. Such MPEG-2TS technology is described in detail for example in Hiroshi Fujiwara, ISOIEC 13818 series, Point Zukaishiki Saishin MPEG Kyokasho, published by Nippon Denki Kogyokai, edited by ASCII Publishing (Aug. 1, 1994) and in All of video and audio compression technology, Interface additional edit., edited by Hiroshi Fujiwara (Apr. 1, 2000).

In the following, there will be explained an editing process in case of dividing, into two, MPEG-2TS data having a data structure as shown in FIG. 6 and recorded on a random accessible recording medium. FIG. 7 illustrates such dividing editing process.

In FIGS. 6 and 7, V indicates TS packet data having video information, and A indicates TS packet data having audio information. The TS packets having the video information include a white-boxed V and a hatched V, in which the hatched V indicates video information TS packet data including a GOP start code. Also the TS packets having the audio information include a white-boxed A and a hatched A, in which the hatched A indicates audio information TS packet data including an audio frame start code. A suffix to each packet is a packet number indicating a timing of synchronized reproduction of video information and audio information. For example a video information TS packet V0 and an audio information packet A0 are reproduced in synchronization.

A timing of multiplexing a video signal and an audio signal is ordinarily determined by a function of an encoding apparatus for the audio signal and the video signal and a decoding rule of the MPEG standard. As shown in FIGS. 6 and 7, the video information packet and the audio information packet to be synchronously reproduced are stored in physically distant locations, so that the TS packetized video signal of an 1GOP mostly contains a TS packetized audio frame signal belonging to another GOP.

In case of a demand from the user to divide the MPEG-2TS data, recorded on the recording medium in the above-described method, in a position DIV at a boundary of the GOP units as shown in FIG. 7, there are generated, by a dividing editing, a stream from the head to the dividing position and a stream from the dividing position to the end.

In case of dividing such MPEG-2TS data at the dividing position DIV shown in FIG. 7, since the TS packet having the audio information is present in the vicinity of the dividing position within the TS packet having the video information of 1 GOP, a stream prepared as the data from the head of the steam to the dividing position includes incomplete audio data in which the last data having the audio information does not satisfy the data structure of an audio frame as a minimum decoding unit, as shown in FIG. 7. Also a stream prepared as the data from the dividing position to the stream end includes incomplete audio data in which the initial data having the audio information does not satisfy the data structure of an audio frame as a minimum decoding unit, as shown in FIG. 7.

On the other hand, a system for recording and editing a video signal and an audio signal, compression encoded in-the MPEG method, in a TS packet state is associated with following drawbacks. The video signal is MPEG compression encoded in the unit of a GOP, but may not be compression encoded with a fixed bit rate as the length of the image data of a frame is variable depending on the picture type such as an I picture, a P picture or a B picture or on the picture pattern.

On the other hand, as the audio signal is compressed with a fixed rate, the packets of the corresponding video and audio signals may be located in physically distant positions on the TS data, even when such corresponding video and audio signals are simultaneously encoded. In case the packets of the corresponding video and audio signals are located in physically distant positions on the TS data, an editing operation of dividing the multiplexed TS data in the middle thereof, there may result drawbacks such as an aberration between the timings of connection of the video signal and connection of the audio signal, or a deficiency in either data.

Therefore the prior editing method explained in FIG. 7 generates a discontinuity in the audio frame structure in the vicinity of the dividing position, thus resulting in an abnormal noise giving an unpleasant feeling to the user or in a soundless state.

SUMMARY OF THE INVENTION

The present invention provides a method and an apparatus for editing an MPEG-2 transport stream which does not cause an unpleasant abnormal noise or a soundless state even by a dividing process.

The present invention provides a method for editing a video signal and an audio signal, subjected to time-shared multiplex compression by an MPEG-2 transport method and recorded on a random accessible recording medium, the method including:

a step of designating a dividing position of the video signal at a boundary of video TS packets constituting a GOP;

a step of constructing a stream in front of the designated dividing position so as to include all audio TS packets corresponding to video TS packets present in such stream, and overwriting a video TS packet, not having a corresponding audio TS packet in the stream, with a dummy TS packet; and a step of overwriting, in a stream behind the designated dividing position, an audio TS packet with a dummy TS packet until an audio TS packet, coinciding with a reproducing timing of a video TS packet at the dividing position, appears.

The present invention also provides an apparatus for editing a video signal and an audio signal, subjected to time-shared multiplex compression by an MPEG-2 transport method and recorded on a random accessible recording medium, the apparatus including:

means which designates a dividing position of the video signal at a boundary of video TS packets constituting a GOP; and means which constructs a stream in front of the designated dividing position so as to include all audio TS packets corresponding to video TS packets present in such stream, overwriting a video TS packet, not having a corresponding audio TS packet in the stream, with a dummy TS packet, and overwriting, in a stream behind the designated dividing position, an audio TS packet with a dummy TS packet until an audio TS packet, coinciding with a reproducing timing of a video TS packet at the dividing position, appears.

BRIEF DESCRIPTION OF THE DRAWINGS

FIG. 2 is a flow chart showing a division editing method of the embodiment shown in FIG. 1;

FIG. 3 is a flow chart showing an audio data compensating process for M1 after the dividing process in FIG. 2;

FIG. 4 is a flow chart showing an audio data compensating process for M2 after the dividing process in FIG. 2;

FIG. 5 is a view for explaining a division editing process shown in FIG. 2;

FIG. 6 is a view showing a data structure of MPEG-2TS data; and

FIG. 7 is a view showing a prior-dividing process for MPEG-2TS data.

DETAILED DESCRIPTION OF THE PREFERRED EMBODIMENTS

Figure 1:
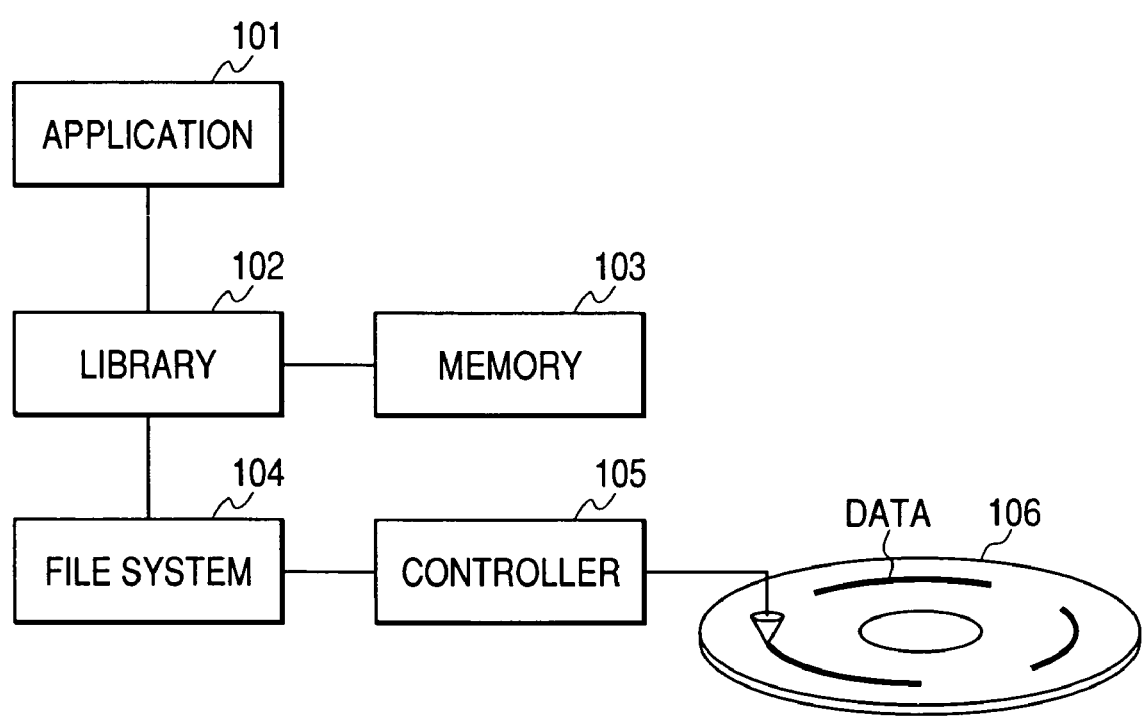
FIG. 1 is a block diagram showing an embodiment of an MPEG-2TS data editing apparatus of the present invention.

In the following, a best embodiment for carrying out the present invention will be explained in detail with reference to the accompanying drawings. FIG. 1 is a block diagram showing an embodiment of an MPEG-2 transport editing apparatus of the present invention. FIGS. 2 to 4 are flow charts showing a division editing procedure for MPEG-2TS data recorded on a random accessible recording medium, and FIG. 5 is a view for explaining such dividing process.

FIG. 2 shows a dividing process while FIGS. 3 and 4 show a compensation process for audio data after the dividing process as will be explained later. The MPEG-2 stream before to the dividing process, shown in FIG. 5, has a data structure, as in the prior configuration shown in FIG. 6, a data structure of AV information subjected to a time-shared multiplex complexing in an MPEG-2TS format and recorded on a recording medium.

Also in FIG. 5, as in FIGS. 6 and 7, V indicates a TS packet data having video information, and A indicates a TS packet data having audio information. The TS packets having the video information include a white-boxed V and a hatched V, in which the hatched V indicates video information TS packet data including a GOP start code. Also the TS packets having the audio information include a white-boxed A and a hatched A, in which the hatched A indicates audio information TS packet data including an audio frame start code. A suffix to each packet is a packet number indicating a timing of synchronized reproduction of video information and audio information.

In FIG. 1, there are shown an application 101, a library 102, and a non-volatile memory 103, such as an SRAM or a DRAM. When a request for a dividing process for the MPEG-2TS data is generated from the application 101, the library 102 executing a dividing process as will be explained later. There are also shown a file system 104 for a file management, a controller 105 and a disk 106 constituting an information recording medium. The controller 105 executes data writing and reading on and from the disk 106.

In the following, an editing method for the MPEG-2 stream data in the present embodiment. At first, it is assumed that the application 101 generates a stream dividing request for dividing MPEG-2TS data in a TS packet position, represented by DIV in FIG. 5 and corresponding to a boundary of GOP (Group Of Pictures) data. In response to such request, the library 102 executes a division editing process shown in FIG. 2. At first, a TS packet constituted of a unit of 188 bytes, is read from a head or a division request position of an MPEG-2TS stream to be edited, recorded on the disk 106, and stored in the memory 103 (step 201).

Then the header of the TS packet read into the memory 103, and there is detected a program map table (PMT) packet having system stream information of the MPEG-2TS to be subjected to the dividing process (step 202). The PMT packet, though not illustrated in FIG. 5, is present in the stream data shown in FIG. 5. In case the PMT packet cannot be detected, the sequence returns to the step 201 to again read a succeeding TS packet from the recording medium into the memory 103, and the step 202 is repeated again to detect the PMT packet. Thereafter the steps 201 and 202 are repeated until the PMT packet is detected.

When the PMT packet data are detected, there is obtained, from the stream information in such packet, an identifier (PID) of the TS packet having video data and audio data constituting the MPEG-2TS data to be subjected to the editing (step 203). The PMT packet contains identifiers for all the packets of the stream. In the present embodiment, an obtained PID for a video TS packet is represented by V_PID, while an obtained PID for an audio TS packet is represented by A_PID.

Then, as shown in FIG. 5, the MPEG-2TS data are divided into two at a TS packet including a GOP start code for which the division is designated, thereby generating two MPEG-2TS data, namely data (hereinafter referred to as M1) from the head of the MPEG-2TS data before division to the dividing position thereof and data (M2) from the dividing position to the end (step 204). The dividing process of the present embodiment is executed, without a new data overwriting on the original MPEG-2TS data present on the disk 106 or a data destruction, by merely copying the original MPEG-2TS data and preparing new MPEG-2TS data.

Then, from a PES header of a video PES packet constituted by a payload of the TS packet including the GOP start code which is designated by the dividing request, there is obtained output-reproduction time information ($PTS_{GOP}$) of the PES packet data in a data decoding reproduction device (step 205). As shown in FIG. 7, the header information of the TS packet data including the GOP start code contains a PES start code, reproduction-output time information, decoding time information etc., and the reproduction time information of the PES packet in the decoding reproduction device means such reproduction-output time information. Such output-reproduction time information ($PTS_{GOP}$) is an image display time for one picture (reproducing time of video signal).

Explanation of the processes of the steps 204 and 205 merely indicates the preparation of two new MPEG-2TS data at the dividing position and the necessity of acquisition of the reproduction-output time at the dividing GOP position, and does not define the sequence of these processes.

After such dividing process, the two MPEG-2TS data (M1, M2) prepared in the step 204 are subjected to an audio data compensation process. An audio data compensation process for M1 is executed in a step 206, and an audio data compensation process for M2 is executed in a step 207. Thus a dividing process is terminated by the aforementioned processes, and a result is informed to the application (user) 101.

FIG. 3 is a flow chart showing the audio data compensating process for M1 in the step 206, and FIG. 4 is a flow chart showing the audio data compensating process for M2 in the step 207. At first reference is made to FIG. 3 for explaining the audio data compensating process for M1.

At first, in the original MPEG-2TS data shown in FIG. 5, a TS packet is read from the disk 106 into the memory 103, in a direction from the TS packet position at the GOP constituting the division boundary toward the end of the stream (step 301). In the example shown in FIG. 5, the reading is started from a video information TS packet V2 at the dividing position. Then a header information of the TS packet read into the memory 103 is analyzed to obtain a PID of the TS packet (step 302).

Then, there is discriminated whether the obtained PID of the TS packet coincides with the PID of the video TS packet obtained in the step 203 in FIG. 2 (step 303). In case both PIDs mutually coincide, null TS packet data (dummy TS packet data) D not having a video signal nor an audio signal are added to the end of the MPEG-2TS data M1 after the editing, as shown in FIG. 5 (step 304). Thereafter the sequence returns to the step 301 to execute a similar process. In the example shown in FIG. 5, dummy data D are added by 3 units since the video information TS packet V2 are present in continuation by 3 units after the dividing position.

In case the V_PID does not coincide in the step 303, the sequence proceeds to a step 305 to discriminate whether the PID of the TS packet coincides with the PID (A_PID) of the audio information TS packet obtained in the step 203 in FIG. 2. In case of no coincidence, null TS packet data (dummy TS packet data) D not having an audio signal nor an audio signal are added to the end of the MPEG-2TS data M1 after the editing, but, in case of coincidence (step 306), the sequence proceeds to a step 307 to detect, from the header information of the TS packet, an information bit (unit start indicator) indicating whether a new PES packet is started in the payload portion of the TS packet.

In the example shown in FIG. 5, the step 301 reads a next audio information TS packet A1 which is then subjected to processes in the steps 302-305, in which the step 305 identifies coincidence and the step 307 then discriminates whether a new PES packet is started.

In case the information bit detected in the step 307 is 0, indicating that a new PES packet is not started, such TS packet is merely copied and added to the end of the MPEG-2TS data M1 after the editing (step 308), whereupon the sequence returns to the step 301. In the example shown in FIG. 5, the audio information TS packet A1 succeeds to an audio information TS packet A1 of the stream in front of the dividing position and does not start a new PES packet, so that the audio information TS packet A1 is copied and added after the three dummy TS packets D as shown in FIG. 5.

On the other hand, in case the information bit is 1, indicating that a new PES packet is started, PES packet data contained in the payload data of the TS packet are analyzed to obtain a reproduction start time ($PTS_{AUD}$) of the audio frame (step 309).

Then a comparison on the time axis is made between the obtained reproduction start time ($PTS_{AUD}$) of the audio frame and the reproduction-output time ($PTS_{GOP}$) of the video data at the dividing GOP position obtained in the step 205 in FIG. 2 (step 310). In case the comparison provides a result $PTS_{AUD} > PTS_{GOP}$, namely the reproduction-output time of the audio frame is later in time than the reproduction-output time of the video data at the dividing GOP position, the audio data compensating process for the MPEG-2TS data M1 after the editing is thus terminated.

On the other hand, in case $PTS_{AUD} < PTS_{GOP}$, namely the reproduction-output time of the audio frame is earlier in time than the reproduction-output time of the video data at the dividing GOP position, the TS packet is copied and added to the end of the MPEG-2TS data M1 after the editing (step 311), whereupon the sequence returns to the step 301 and repeats a similar process.

In the example shown in FIG. 5, the step 301 reads and processes an audio information TS packet A2 succeeding to the audio information TS packet A1. As the audio information TS packet A2 starts a new audio information as shown in FIG. 5, the sequence proceeds to the step 309 to obtain, from the audio information TS packet A2, the $PTS_{AUD}$ which is processed in the step 310.

In this example, the reproduction start time ($PTS_{AUD}$) means a reproduction time of the audio information TS packet A2 (3 units in the example of FIG. 5), and the reproduction-output time ($PTS_{GOP}$) is a reproducing time of the video information (in the example shown in FIG. 5, a reproducing time of the video information after the dividing position). In the example shown in FIG. 5, the process is terminated because of $PTS_{AUD} > PTS_{GOP}$. M1 is completed by adding, as shown in FIG. 5, dummy TS packets D (three units) and an audio information TS packet A1 to the M1, in front of the dividing position, after the compensating process.

Such audio data compensating process on M1 causes an addition of three dummy TS packets D and an audio information TS packet A1 at the end of M1 as shown in FIG. 5, whereby the last audio data (A1 in FIG. 5) in the M1 data become complete audio data.

Then, reference is made to FIG. 4 for explaining the audio data compensating process for the MPEG-2TS stream M2 after the division. At first, in the original MPEG-2TS data, a TS packet is read from the disk 106 into the memory 103, in a direction from the TS packet position at the GOP constituting the division boundary toward the end of the stream (step 401). Then a header information of the TS packet read into the memory 103 is analyzed to obtain a PID of the TS packet (step 402).

Then, there is discriminated whether the obtained PID of the TS packet coincides with the PID of the video TS packet obtained in the step 203 in FIG. 2 (step 403). In case of coincidence, the sequence returns to the step 401 for repeating the process. More specifically, a next TS packet is read and a PID is obtained from the header of such TS packet, and there is discriminated whether such PID coincides with the PID (V_PID) of the video information TS packet obtained in the step 203 in FIG. 2. In the example shown in FIG. 5, the video information TS packet V2 continues by 3 units from the dividing position, so that the steps 401-403 are repeated three times to read three V2s as shown in FIG. 5.

In case of no coincidence in the step 403, the sequence proceeds to a step 404 to discriminate whether the PID of the TS packet coincides with the PID (A_PID) of the audio information TS packet obtained in the step 203 in FIG. 2. In case of no coincidence, an overwriting is executed with null TS packet data. This applies also to data which are not video information nor audio information, though such is not illustrated in FIG. 5.

On the other hand, in case of coincidence in the step 404, the sequence proceeds to a step 406 to discriminate whether a new PES packet is started, namely to detect, from the header information of the TS packet, an information bit (unit start indicator) indicating whether a new PES packet is started in the payload portion of the TS packet. In case the detected information bit is 0, indicating that a new PES packet is not started, a null TS packet not having a video signal nor an audio signal is overwritten in the position of such packet.

In the example shown in FIG. 5, the step 401 reads a 4th audio information TS packet A1 from the dividing position, which is subjected to the process starting from the step 402, and the step 404 identifies a coincidence and the process from the step 406 is thus executed. In this example, as shown in FIG. 5, the audio information TS packet A1 succeeds to an audio information TS packet A1 of the stream in front of the dividing position so that the step 406 discriminates that a new PES is not started. Therefore the step 407 executes an overwriting with the null TS packet D not having a video signal nor an audio signal in the position of the TS packet in the MPEG-2 stream M2 after editing, same as in the original TS packet position, whereupon the sequence returns to the step 401. In FIG. 5, 3 video information TS packets V2 are followed by a dummy TS packet D.

On the other hand, in case the information bit is 1, indicating that a new PES packet is started, PES packet data contained in the payload data of the TS packet are analyzed to obtain a reproduction start time ($PTS_{AUD}$) of the audio frame (step 408). Then a comparison on the time axis is made between the obtained reproduction start time ($PTS_{AUD}$) of the audio frame and the reproduction-output time ($PTS_{GOP}$) of the video data at the dividing GOP position obtained in the step 205 in FIG. 2 (step 409).

In case the comparison provides a result $PTS_{AUD}>PTS_{GOP}$, namely the reproduction-output time of the audio frame is later in time than the reproduction-output time of the video data at the dividing GOP position, the audio data compensating process for the MPEG-2 stream data M2 after the editing is thus terminated.

On the other hand, in case $PTS_{AUD}<PTS_{GOP}$, namely the reproduction-output time of the audio frame is earlier in time than the reproduction-output time of the video data at the dividing GOP position, a null TS packet not having a video signal nor an audio signal is overwritten in the position of the TS packet in the MPEG-2 stream M2 after editing, same as in the original TS packet position (step 410).

In the example shown in FIG. 5, the step 401 reads and processes an audio information TS packet A2 succeeding to the audio information TS packet A1. As the audio information TS packet A2 starts a new audio information as shown in FIG. 5, the sequence proceeds to the step 408 to obtain, from the audio information TS packet A2, the $PTS_{AUD}$ which is processed in the step 409.

In this example, the reproduction start time ($PTS_{AUD}$) means a reproduction time of the audio information TS packet A2 (3 units in the example of FIG. 5), and the reproduction-output time ($PTS_{GOP}$) is a reproducing time of the video information (in the example shown in FIG. 5, a reproducing time of the video information after the dividing position). In the example shown in FIG. 5, the process is terminated because of $PTS_{AUD}>PTS_{GOP}$. In the example shown in FIG. 5, the compensation process is terminated by the audio information TS packet A2 after the dummy TS packet D, and M2 is completed by adding the ensuing data.

Thus, in the stream after the dividing position, the initial audio data in the stream M2 after the dividing position can be made complete by overwriting the audio information with a TS packet replaced by dummy data, until an audio information packet (A2 in FIG. 5) matching the reproduction timing of the video information at the dividing position (information V2 in FIG. 5) appears.

In case of reproducing the data subjected to such dividing process and present on-the disk 106, such dummy TS packet D is not expanded in the reproduction but is skipped.

What is claimed is:

1. A method for editing a video signal and an audio signal, subjected to time-shared multiplex compression by an MPEG-2 transport method and recorded on a random accessible recording medium, the method comprising:

designating a dividing position of the video signal at a boundary of video TS packets constituting a GOP;

constructing a constructed stream from a first stream in front of said designated dividing position, a video TS packet present in a second stream behind said designated dividing position, and all audio TS packets present in the second stream corresponding to audio TS packets present in the first stream first overwriting a video TS packet in the constructed stream, not having a corresponding audio TS packet in the first stream, with a dummy TS packet; and second overwriting, in the behind stream, an audio TS packet with a dummy TS packet until an audio TS packet, coinciding with a reproducing timing of a video TS packet at said dividing position, appears.

2. A method according to claim 1, wherein said dummy TS packet is null data.

3. An apparatus for editing a video signal and an audio signal, subjected to time-shared multiplex compression by an MPEG-2 transport method and recorded on a random accessible recording medium, the apparatus comprising:

means which designates a dividing position of the video signal at a boundary of video TS packets constituting a GOP; and means for constructing a constructed stream from a first stream in front of said designated dividing position, a video TS packet present in a second stream behind said designated dividing position, and all audio TS packets present in the second stream corresponding to video TS packets present in the first stream, and performs:

a first overwriting a video TS packet in the constructed stream, not having a corresponding audio TS packet in the first stream, with a dummy TS packet, and a second overwriting, in the behind stream, an audio TS packet with a dummy TS packet until an audio TS packet, coinciding with a reproducing timing of a video TS packet at said dividing position, appears.

* * * * *